Dec. 15, 1925.  1,565,875
G. VON HAASE
UNLOADING APPARATUS FOR VESSELS
Filed July 28, 1923  4 Sheets-Sheet 3
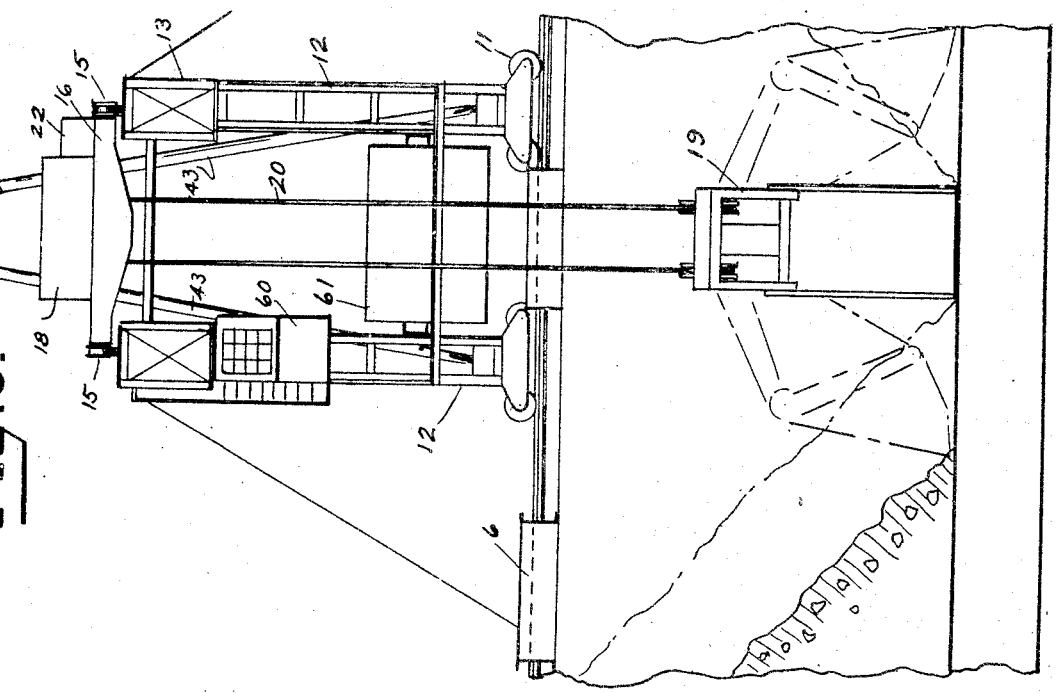
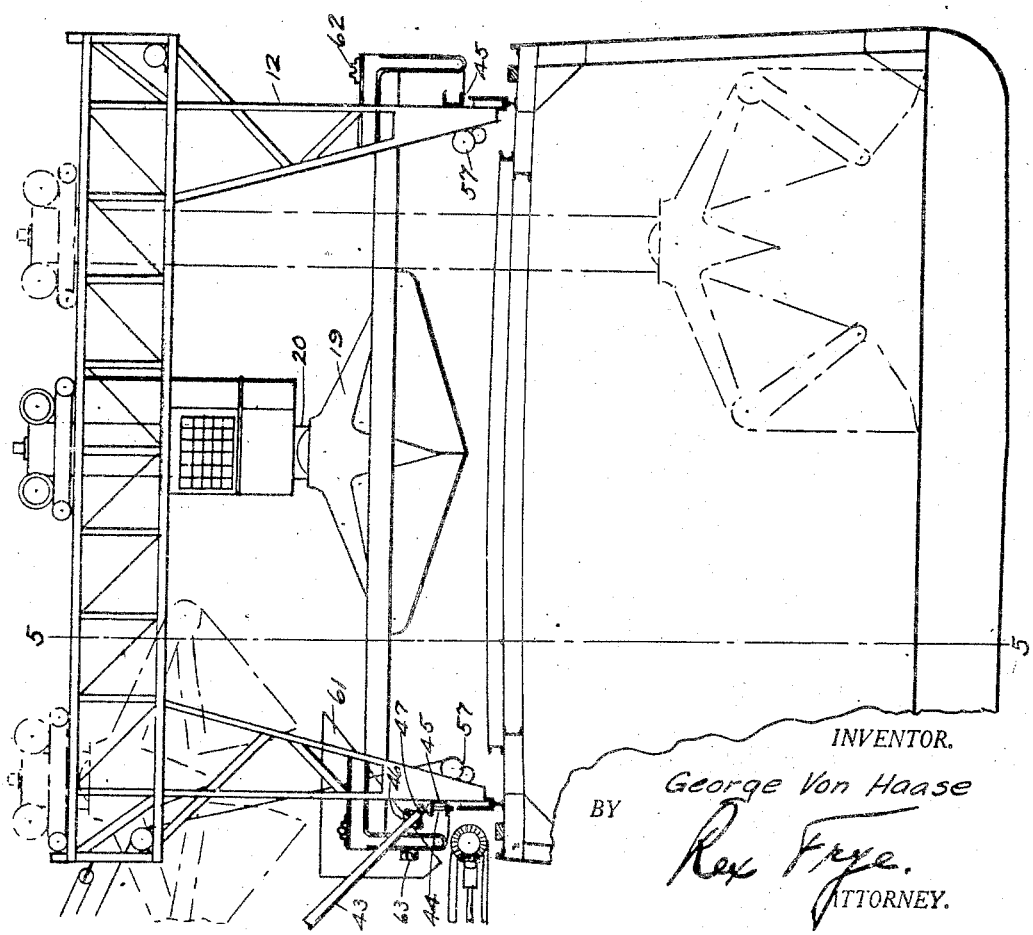
INVENTOR.
George Von Haase
BY
Rex Frye.
ATTORNEY.

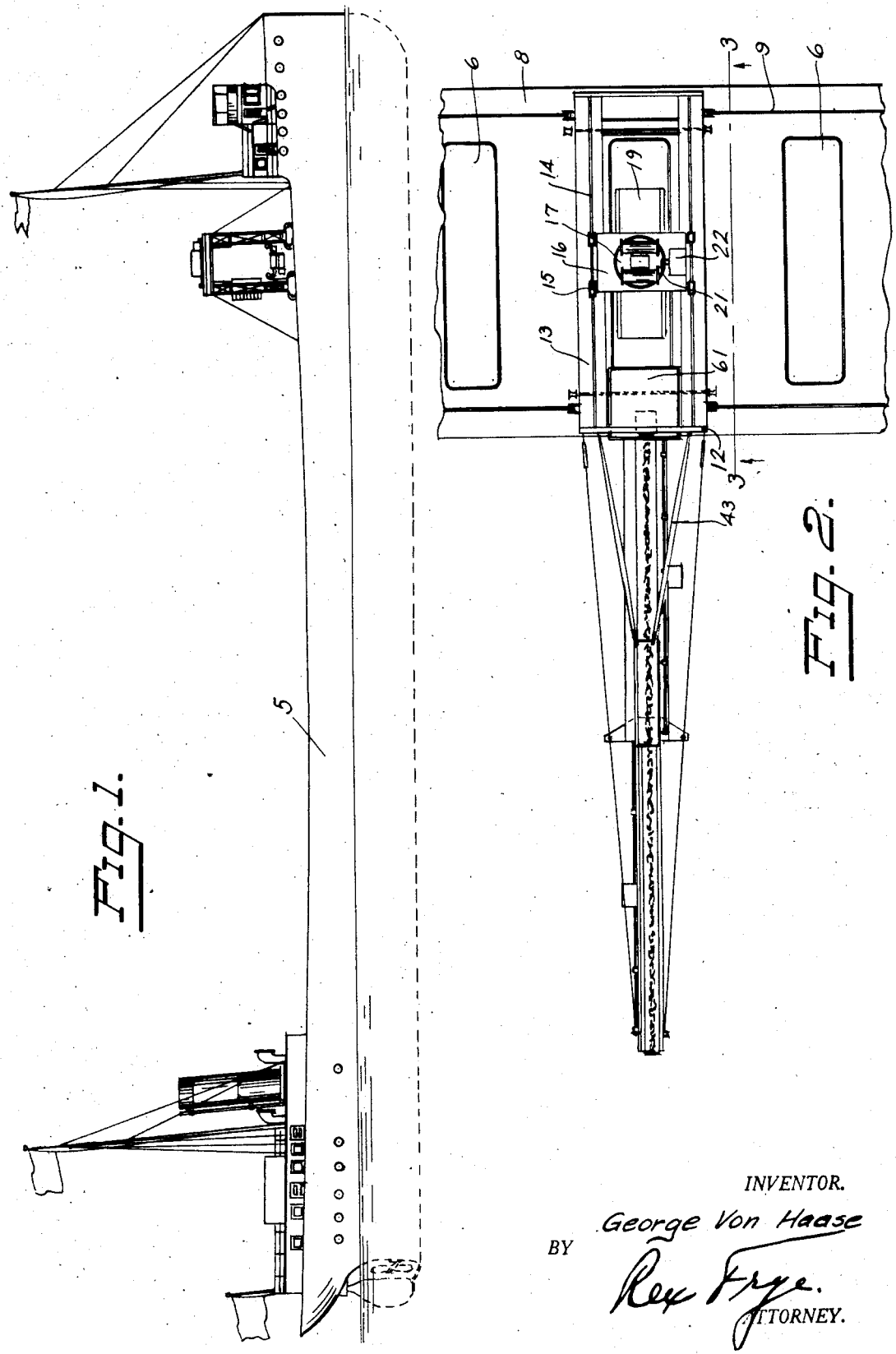

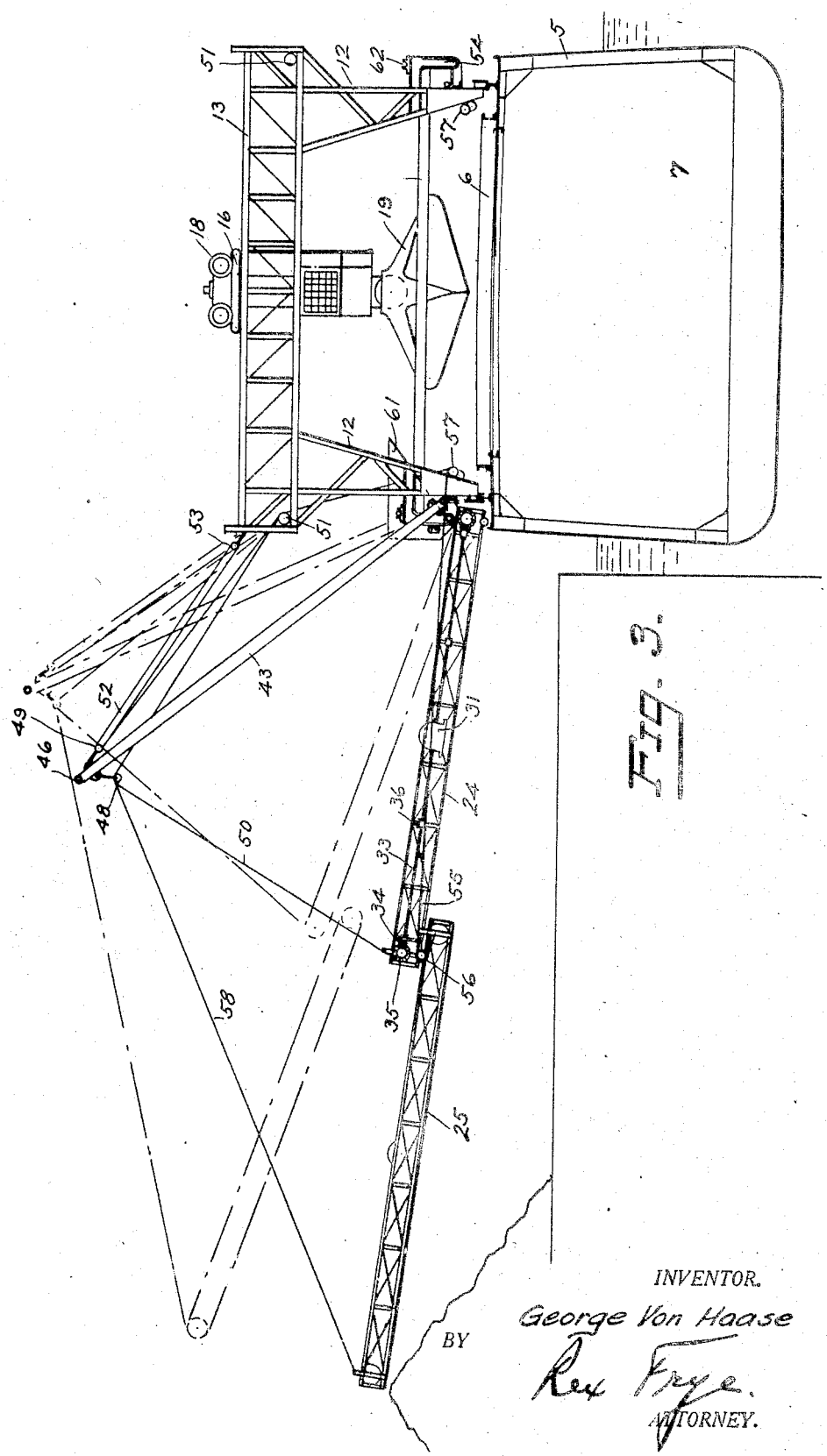

Dec. 15, 1925.  1,565,875
G. VON HAASE
UNLOADING APPARATUS FOR VESSELS
Filed July 28, 1923  4 Sheets-Sheet 4
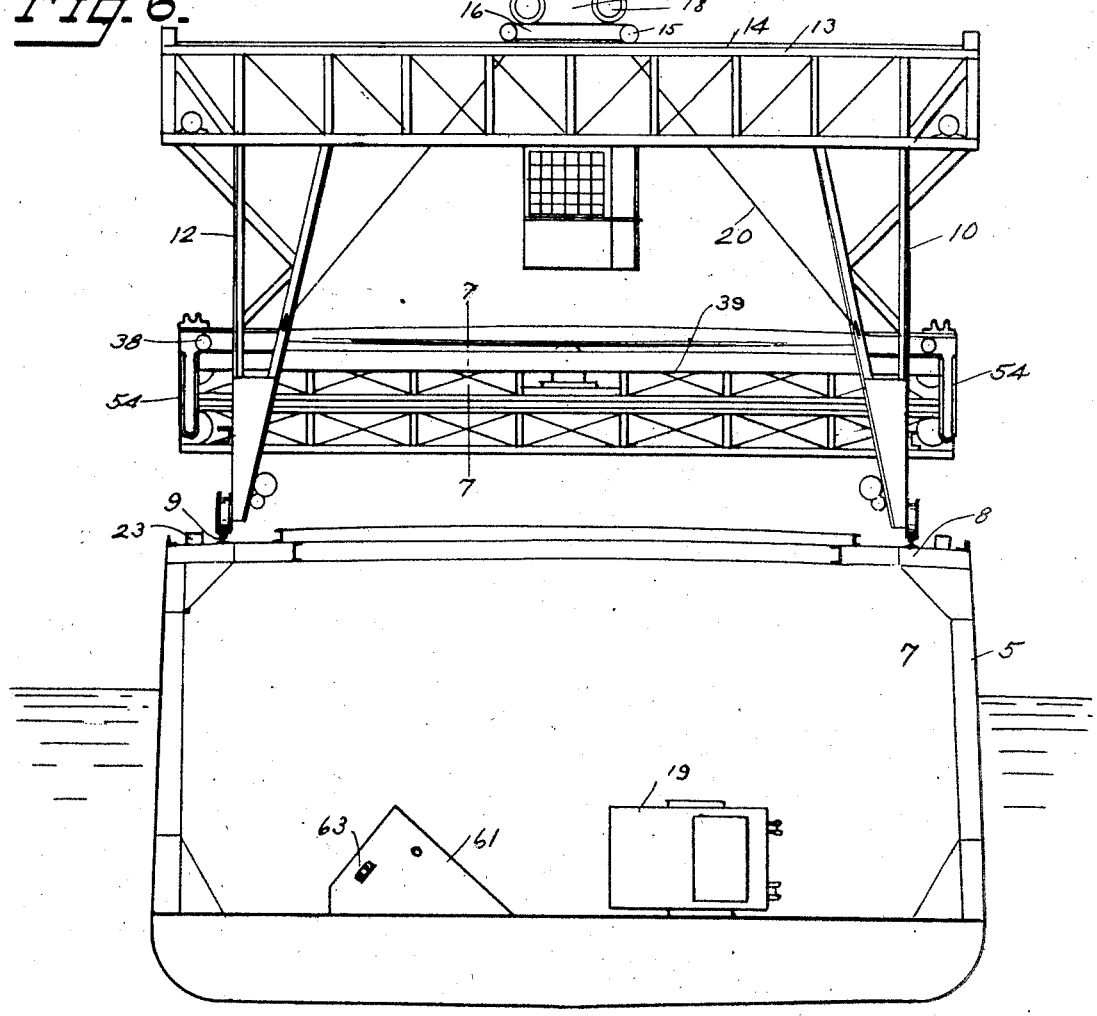
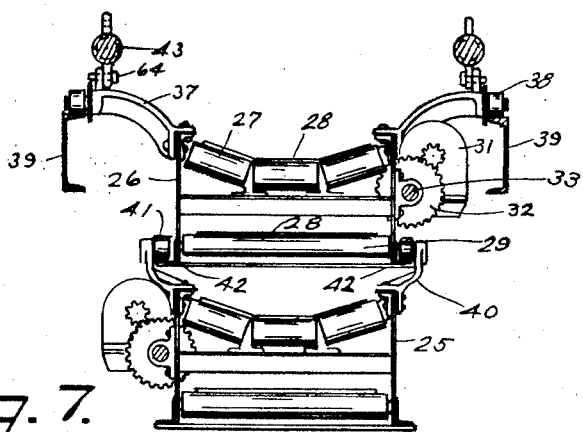
INVENTOR.
George Von Haase
BY
Rex Frye.
ATTORNEY.

Patented Dec. 15, 1925.

1,565,875

UNITED STATES PATENT OFFICE.

GEORGE VON HAASE, OF DETROIT, MICHIGAN.

UNLOADING APPARATUS FOR VESSELS.

Application filed July 28, 1923. Serial No. 654,330.

*To all whom it may concern:*

Be it known that I, GEORGE VON HAASE, a citizen of the Republic of Austria (who has taken out his first papers for American citizenship), residing at Detroit, county of Wayne, and State of Michigan, have invented a new and Improved Unloading Apparatus for Vessels, of which the following is a specification.

This invention relates to apparatus for expeditiously unloading the cargoes of freight carrying vessels, and has for its primary object the provision of self-contained power-driven hoisting and distributing apparatus on the deck of the vessel in position for rapidly and economically unloading the cargo from the hold to varying distance at either side of the vessel.

A further object of the invention is the arrangement of one or more gantry cranes on the deck of the vessel, with provision for storing therein a plurality of power driven conveyors which may be moved to varying distances at either side of the vessel and independently driven to distribute the cargo when deposited thereon.

A further object of the invention is the mounting of a bucket of the clam shell or like types on a plurality of drums which are supported upon a rotatable frame, whereby the drums may be turned with the bucket whenever desired without twisting the intermediate ropes or cables.

Other objects and advantages will be apparent from the following description wherein reference is made to the accompanying drawing illustrating a preferred embodiment of the invention, and wherein similar reference numerals designate similar parts throughout the several views.

In the drawings:—

Fig. 1 is a side elevation of a vessel equipped with my improved unloading apparatus.

Fig. 2 is a plan view of a portion of the deck of the vessel with my apparatus thereon in position for unloading.

Fig. 3 is a transverse sectional view taken substantially on the line 3—3 of Fig. 2.

Fig. 4 is a similar view on an enlarged scale and showing in dotted lines the various positions assumed by the bucket and lifting mechanism.

Fig. 5 is an enlarged detail view taken substantially on the line 5—5 of Fig. 4.

Fig. 6 is a transverse section showing the position assumed by the distributing mechanism and lifting mechanism when not in use, and Fig. 7 is a detail sectional view taken substantially on the line 7—7 of Fig. 6.

In the drawings the numeral 5 designates the hull of the vessel, preferably of sufficient size and equipped for travel on the Great Lakes or for ocean travel, and 6 designates a plurality of spaced hatchways arranged transversely of the hull 5 throughout the entire length of the bunker space 7 of the vessel. Mounted upon the deck 8 at each end of the hatchways 6 are tracks 9 extending longitudinally of the vessel for substantially the entire length of its bunker space. A gantry crane 10 is mounted for movement upon the tracks 9, a pair of flanged wheels 11 being preferably arranged at the base of each of the side members 12 of the crane, the side members being arranged in pairs suitably spaced from each other at each side of the vessel. Across each pair of side members 12 is arranged a bridge 13 (see Fig. 5) carrying a track 14 for the reception of the flanged wheels 15 of a trolley 16 extending over the full width between the side members and supporting a turn-table 17 on which is mounted a plurality of drums 18 for the ropes by which the bucket 19 is supported and controlled in its opening and closing movements. The bucket 19 is herein shown as the clam shell type, though other types may also be employed. The ropes 20 for the bucket are preferably four or more in number, and wind upon the drums 18 fixed on the turn-table 17, whereby the bucket can be turned to any desired angle when the turn-table is rotated without twisting or changing the relative positions of the ropes 20. As best shown in Fig. 2 the turn-table 17 is equipped with a bevel gear-wheel 17ª mounted for rotation in a horizontal plane and cooperating with the bevel pinion 21 adapted to be driven by a motor 22 carried by the trolley frame 16.

Separate driving mechanism, such as motors, may be employed for moving the trolley 16 transversely of the vessel and for moving the gantry crane longitudinally of the vessel. Preferably such motors are mounted upon the gantry crane framework and a plurality of junction boxes 23 are arranged at intervals along the deck of the vessel for connection with a suitable source of electrical energy, such as a dynamo mounted in the hull of the ship. Suitable wiring may be arranged between the source of power and the several junction boxes 23, and it is only necessary to plug in to the nearest junction boxes when it is desired to use the unloading mechanism. The motor 22 for rotating the turn-table 17 is also connected with the source of power, as are the motors presently to be described for moving the endless belt conveyors of the distributing mechanism. By constructing all of the electrical mechanism except the source of power on the gantry crane frame work I secure a self-contained unloading mechanism that is quite simple and easily operated.

The distributing mechanism for transporting the cargo elevated by the lifting mechanism to any desired position on shore or on another vessel comprises a plurality of endless belt conveyors, herein shown as comprising an upper conveyor 24 and a lower conveyor 25 nested within the framework of the gantry crane when not in use, substantially as shown in Fig. 6. The upper conveyor 24 comprises a framework 26 supporting the upper rollers 27 arranged to shape the belt 28 during its conveying flight and the lower rollers 29 which guide the belt on its return flight. Suitable power rollers 30 are arranged at each end of the framework and driven by suitable gearing operated from the motor 31. As herein shown the motor 31 drives a reducing gear 32 fixed on the shaft 33 carrying at its opposite ends bevel pinions 34 meshing with bevel gears 35 on the shafts of the power rollers 30. If desired suitable clutches 37 may be arranged intermediate the motor 31 and the power rollers 30, (see Fig. 3) or a reversible motor can be employed and both of the power rollers 30 driven at all times when the motor is in operation.

The framework 26 of the upper conveyor carries laterally extending brackets 37 (see Fig. 7) supporting at their extremities antifriction rollers 38 resting upon the channel bars 39 secured transversely of the vessel between the forward and rear pairs of side frames 12 of the crane. The channel irons 39 form supports for the upper conveyor unit when nested within the gantry crane when the unloading mechanism is not in use, and also form tracks for the guidance of the conveyors when it is desired to utilize the distributing mechanism.

The lower conveyor 25 is formed with similar side frames, shaping rollers and supporting rollers as the upper conveyor 24, and the same construction is utilized for driving power rollers at the opposite ends of the conveyor. The lower conveyor is supported from the upper conveyor through laterally extending brackets 40 adjacent its opposite ends each of which carry anti-friction rollers 41 riding upon the horizontal flanges of angle irons 42 fixed adjacent the bottom of the upper conveyor (see Fig. 7). When the conveyors are nested within the gantry crane all of the rollers 41 rest upon the angle irons 42 of the upper conveyor, and when it is desired to move the lower conveyor relatively to the upper conveyor, the rollers 41 ride upon the angle irons 42 as tracks, one pair of rollers 41 remaining upon the angle irons 42 to support that end of the lower conveyor and maintain the proper relation of the parts of the lower and upper conveyor units.

When it is desired to move the conveyor units from the nested position shown in Fig. 6, a pair of booms 43 are mounted with one end secured to belaying pins 44 journalled in brackets 45 secured to the frame work of the crane (see Fig. 4). The belaying pin is mounted for vertical rotation and the booms 43 preferably carry plates at their extremities having spaced ears 46 adapted to line with the eye of the belaying pin for the reception of a horizontally disposed pivot pin 47, on which the booms 43 are adapted to swing during their movements in supporting the conveyor units. As best seen in Fig. 2 the booms 43 extend angularly from the side members 12 of the crane toward each other and at their free extremities carry pulleys 48 and 49 respectively through lateral eyes in the end plate 46. The pulley 48 carries a rope 50 secured at its lower extremity to the free end of the upper conveyor unit 24 and at its opposite extremity to a motor driven drum 51 mounted upon the bridge 13 of the crane. (See Fig. 3.) The pulley 49 carries rope 52 passing over the guide pulley 53 on the bridge of the crane and also passing over motor driven drum 51. Suitable clutch mechanism is arranged to permit the simultaneous paying out of ropes 50 and 52 during the movement of the upper conveyor unit 24. When the conveyor supporting rope 50 is suitably wound the free end of the upper conveyor unit 24 is moved along the angle irons 39 of the crane until the opposite end of the conveyor unit is properly seated within guide brackets 54 arranged at each end of the tracks 39 (see Fig. 6). These guide brackets preferably comprise a pair of vertically disposed guide flanges separated at their upper extremities for the reception of the anti-friction rollers 38 of the upper conveyor unit, and bridged at their lower extremities to form a seat for such rollers while the conveyor is being used for distributing cargo. The lower conveyor 25 is moved relatively to the upper conveyor unit by means of a rope 55 connected to the inner end of the lower conveyor unit and passing over a guide pulley 56 at the opposite end of the upper conveyor unit (see Fig. 3), thence passing to a motor driven drum 57 mounted upon the side frames 12 of the crane. A supporting rope 58 is connected with the free end of the lower conveyor and passes over the pulley 48 and is wound around the motor driven drum 57 whereby the supporting rope 58 will be paid out simultaneously with the movement of the lower conveyor unit relatively to the upper conveyor whenever the motor driven drum 57 is rotated.

The operation of my improved unloading apparatus is believed to be apparent. With the apparatus in position for unloading, as shown in Figs. 2, 3, and 4, the clam shell bucket 19 is lowered through one of the hatchways 6 and opened to substantially the position shown in dotted lines in Fig. 5, the weight of the bucket being sufficient to enable it to bury its edges into the cargo, preferably iron ore, coal and the like. The controls for operating the lifting and lowering of the bucket 19 as well as the opening and closing thereof are within the housing 60 on the crane substantially midway of the bridge, in which housing the operator has an unobstructed view of the bucket in all of its positions. When the closing ropes of the bucket are pulled the bucket is swung to its closed position with a load of cargo therein and is then elevated above the hopper and moved laterally into position above the hopper 61 which is demountably secured in bearings 62 at either side of the crane, a stop member 63 on each side of the hopper engaging the side frames 12 of the crane to prevent any tipping movement of the hopper when the cargo is dumped therein from the bucket. The hopper 61 preferably has a slightly greater holding capacity than that of the bucket so that an additional load can be dumped therein before the hopper is completely empty. The cargo within the hopper is fed upon the moving belt 28 of the upper conveyor and whenever the lower conveyor is also employed is fed from the belt 28 to the moving belt of the lower conveyor 25, whence it is delivered to the desired dumping ground on the wharf or into another vessel. The bucket 19 is lowered into the hold of the vessel with its longer axis parallel with the sides of the hatchway 6 and is then turned to any desired position by rotating the turn-table 17. The turn-table is operated by an independent driving mechanism and carries the drums supporting all of the ropes connected with the bucket, so that the rotation of the turn-table turns the bucket without twisting or changing the relative positions of these several ropes. In its turned position, as for example that shown in dotted lines in Fig. 5, the bucket can reach cargo loaded between the hatchways 6, and after being loaded may be again turned to align with the sides of a hatchway for convenient hoisting. It will be noted that such alignment can be secured by continuing the rotation of the turn table in the same direction until it has reached a position a half revolution from that it originally occupied when entering the hatchway, or the turn-table may be returned to its original position.

If more than one crane is employed on a single vessel they are preferably operated from opposite ends of the hold and advanced toward the center of the vessel. After the cargo adjacent one hatchway has been removed to a sufficient extent the crane is moved longitudinally of the vessel to position it above another hatchway, preferably some distance from the first hatchway so that the cargo may be removed equally, whereby the vessel will gradually rise on an even keel. When the cargo has been completely unloaded the unloading mechanism may be readily returned to its normal position. The hopper 61 is dismounted from its bearings 62 and deposited within the hold and the bucket 19 is similarly detached from its supporting ropes and deposited within the hold. The lower conveyor 25 is then moved inwardly from the position shown in Fig. 3 to align with the upper conveyor 24, whereupon the two conveyors are raised from the slotted bracket 54 until the supporting bracket arms 37 of the upper conveyor rests upon the tracks 39 on the crane, and is then slid along the tracks 39 to substantially the position shown in Fig. 6. Suitable stop members may be employed for limiting the movement of the conveyors and for securing them snugly in position within the crane. The ropes for moving and supporting the conveyors are then removed from the booms 43, and the booms positioned above the upper conveyor, in substantially the positions shown in Figs. 6 and 7, being secured in such position by pins 64 or the like. The ropes 20 for supporting the bucket 19 may be secured to the frame work of the crane as shown in Fig. 6, in position for convenient attachment to the bucket when it is again desired to use the unloading apparatus. The ropes for moving and supporting the conveyors may be removed from their pulleys if desired and utilized for lashing the conveyors and booms against movement relatively to the crane when the ship is tossed at sea.

While it will be apparent that the illustrated embodiment of my invention herein disclosed is well calculated to adequately fulfill the objects and advantages primarily stated, it is to be understood that the invention is susceptible to variation, modification and change within the spirit and scope of the subjoined claims.

Having described my invention, I claim:—

1. In unloading apparatus for vessels, a gantry crane mounted for movement longitudinally of the vessel, a trolley movable transversely of the vessel on the crane, a bucket suspended from the trolley for vertical movement, a hopper demountably secured upon the sides of the crane, and a series of conveyors nested between the sides of the crane when not in use and laterally movable beyond the sides of the crane to varying distances.

2. In unloading apparatus for vessels, a gantry crane mounted for movement longitudinally of the vessel, a trolley movable transversely of the vessel on the crane, a bucket suspended from the trolley for vertical movement, a hopper demountably secured upon the sides of the crane, a series of conveyors nested between the sides of the crane when not in use and laterally movable beyond the sides of the crane to varying distances, and means demountably secured upon the crane for moving the conveyors from and to their nested positions and for supporting the outer extremities of the conveyors when extended.

3. In unloading apparatus for vessels, a gantry crane mounted for movement longitudinally of the vessel, a trolley movable transversely of the vessel on the crane, a bucket suspended from the trolley for vertical movement, a hopper demountably secured upon the sides of the crane, a series of conveyors nested between the sides of the crane when not in use and laterally movable beyond the sides of the crane to varying distances, and means demountably secured upon the crane for moving the conveyors from and to their nested positions and for supporting the outer extremities of the conveyors when extended, including a boom adapted to be pivoted at one end upon the crane and ropes suspended from the free end of the boom and secured to the conveyors.

4. In unloading apparatus for vessels, a gantry crane mounted for movement longitudinally of the vessel, a trolley movable transversely of the vessel on the crane, a bucket suspended from the trolley for vertical movement, a hopper demountably secured upon the sides of the crane, a series of conveyors nested between the sides of the crane when not in use and laterally movable beyond the sides of the crane to varying distances, and means demountably secured upon the crane for moving the conveyors from and to their nested positions and for supporting the outer extremities of the conveyors when extended, including a pair of booms adapted to be pivotally mounted upon the sides of the crane at widely separated points and extend toward each other, and ropes suspended from the free ends of the booms to the ends of the respective conveyors.

5. In unloading apparatus for vessels, a gantry crane mounted for movement longitudinally of the vessel, a trolley movable transversely of the vessel on the crane, a bucket suspended from the trolley for vertical movement, a hopper demountably secured upon the sides of the crane, a pair of tracks fixed transversely of the crane below the hopper, an endless belt conveyor supported upon said tracks for lateral movement by the sides of the crane, and slotted brackets arranged at the ends of said tracks to limit the lateral movement of the conveyor in either direction.

6. In unloading apparatus for vessels, a gantry crane mounted for movement longitudinally of the vessel, a trolley movable transversely of the vessel on the crane, a bucket suspended from the trolley for vertical movement, a hopper demountably secured upon the sides of the crane, a pair of tracks fixed transversely of the crane below the hopper, an endless belt conveyor, bracket arms extending laterally from the conveyor and resting upon the tracks for lateral movement thereon, and slotted brackets arranged in said tracks to receive the bracket arms of the conveyor to limit their lateral movement in either direction.

7. In unloading apparatus for vessels, a gantry crane mounted for movement longitudinally of the vessel, a trolley movable transversely of the vessel on the crane, a bucket suspended from the trolley for vertical movement, a hopper demountably secured upon the sides of the crane, a pair of tracks fixed transversely of the crane below the hopper, an endless belt conveyor, bracket arms extending laterally from the conveyor and resting upon the tracks for lateral movement thereon, a pair of tracks extending from the sides of said conveyor, a lower conveyor having bracket arms resting upon said last mentioned tracks for movement upon the upper conveyor section, and means demountably secured upon the crane for independently moving either conveyor and for suspending the portion of the conveyors extending beyond the sides of the crane.

In witness whereof I hereunto set my hand.

GEORGE VON HAASE.